May 8, 1962 R. E. DAVIS 3,033,008
PATTERNED AND COATED ICE TRAY
Filed Aug. 16, 1960

INVENTOR.
Robert E. Davis
BY
Lloyd M. Keighley
His Attorney

United States Patent Office 3,033,008
Patented May 8, 1962

3,033,008
PATTERNED AND COATED ICE TRAY
Robert E. Davis, Dayton, Ohio, assignor to General Motors Corporation, Detroit, Mich., a corporation of Delaware
Filed Aug. 16, 1960, Ser. No. 49,873
4 Claims. (Cl. 62—357)

This invention relates to refrigeration and particularly to freezing devices of the tray and grid type for use in refrigerators.

I am aware of the fact that it is common to anodize aluminum walls of trays and grids of freezing devices employed in household refrigerators and to thereafter apply a desired water repellent coating over the metal walls to facilitate the release or shedding of ice therefrom. The water repellent coating on ice trays and grid walls may be of any suitable or desirable composition of nonmetallic materials such, for example, as is disclosed in the patents to Canter, #2,287,930 dated June 30, 1942; Prance et al., #2,878,659 dated March 24, 1959; and/or in the application of Reindl, Serial No. 698,411 filed November 25, 1957, all assigned to the assignee of this application. The most effective anodizing and efficient coating with the best of known nonmetallic water repellent materials together with the bondage thereof to wall portions or sections of ice trays and grids of freezing devices have not as yet been entirely satisfactory in producing such a device wherein the coating will last indefinitely or throughout a desired period of time. I therefore contemplate an improvement in this art whereby the tenacity of the bond of a water repellent film or layer coextensively applied to a metal wall for use in ice freezing devices is increased to approach an ultimate goal which so far is believed to be unknown to those proficient in the art.

An object of my invention is to provide an improved coated metal wall for use in a freezing device or mold in which water is frozen into ice and contacted by this wall.

Another object of my invention is to provide means on a wall for use in a freezing device employed in refrigerators which will increase the adherence and bondage of a coating or layer of nonmetallic water repellent material thereto or thereon so as to prolong the life of the coating and insure ease of releasing or shedding ice frozen in the device therefrom over an extended period of time.

A further object of my invention is to provide a unique and improved surface on walls of freezing devices such as ice trays and/or grids used in conjunction therewith in refrigerators to which surface a coating or layer of nonmetallic water repellent material can be firmly bonded and more strongly adhered.

A still further object of my invention is to roughen a wall coated with a film or layer of water repellent material for use in the freezing device and adapted to contact ice frozen therein so as to provide the surface of the coating with undulations therealong that are of less magnitude than undulations in the roughened wall whereby the greater thickness of the nonuniform layer along portions of the wall occasioned by undulations therein increases the tenacity of the bond of the material thereto and prolongs the life of the layer.

In carrying out the foregoing objects it is a more specific object of my invention to provide a wall of a freezing device or mold with a multitude of spaced-apart intersecting rows of minute depressions for roughening a surface thereof to increase adherence of a nonmetallic water repellent coating thereto and to form a strong bond between the wall and the material.

Further objects and advantages of the present invention will be apparent from the following description, reference being had to the accompanying drawing wherein a preferred embodiment of the present invention is clearly shown.

Figure 1:
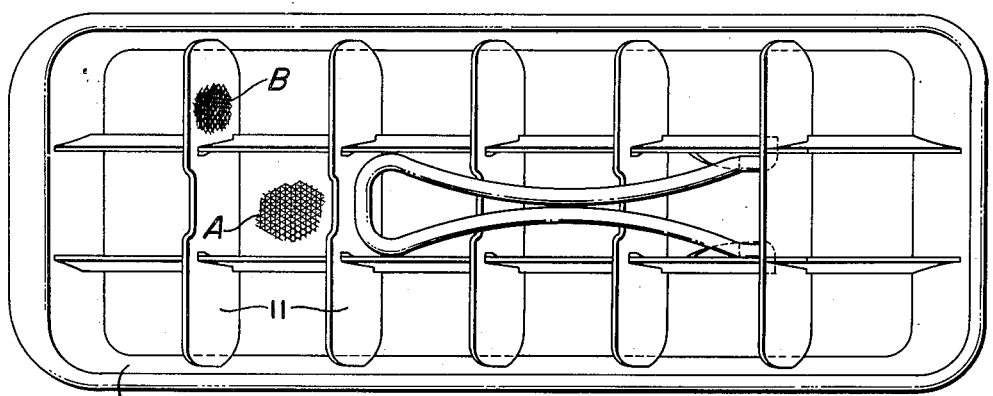
FIGURE 1 is a top view of a freezing device for use in household refrigerator cabinets including a tray member and a grid member disposed therein and having walls provided with my invention.

Referring now to the drawings, for illustrating my invention, I show in FIGURE 1 thereof a freezing device commonly employed in household refrigerators and comprising a metal pan or tray member 10 and a grid structure or member disposed therein including interlocked together movable or tiltable walls 11 dividing the interior of tray 10 into rows of compartments in which separated ice blocks are formed upon freezing water placed in the device and positioning the device within a freezing chamber of a refrigerator. Tray member 10 is pressed or stamped from sheet aluminum alloy and walls 11 of the grid member may be cut or fabricated from this same material but of slightly heavier gauge or thickness. The grid structure may be locked in tray 10 against detachment therefrom, if desired, and is preferably removable as a unitary structure from the tray as described in the patent to A. J. Frei, #2,642,726 dated June 23, 1953 and in other patents of this art.

In accordance with the preceding objects, I propose to roughen a surface or surfaces of a metal wall for use in a freezing device or mold adapted to be partially immersed in water placed therein and to be frozen in the device or mold before applying a water repellent coating to the wall so as to increase the tenacity of the bond of the nonmetallic coating material to the metal wall. For this reason an aluminum alloy sheet from which walls of tray 10 and grid walls 11 are formed is provided with a plurality or multitude of rows of spaced apart shallow or minute depressions in one or both surfaces thereof. It is to be understood that I desire to roughen at least the inner sides of walls of tray 10 and preferably both sides thereof and of grid walls 11. The depressions may be formed in a surface or surfaces of the aluminum sheet by passing it through pressure rollers or other impressing means having a plurality of spaced apart short protuberances thereon such as tines or spikes or the like of any desired or suitable cross-sectional contour. The impressing means are arranged to make depressions in the aluminum sheet that are patterned in parallel rows and angularly intersecting rows to provide uniformly roughened surfaces thereon which impart a stippled-like appearance or finish to walls of articles or objects fabricated therefrom. It is to be understood that the minute depressions provided in the sheet aluminum may be of widely different character or shape so long as they are uniform and provide a uniformly roughened wall surface or surfaces. For example, the depressions could be conical dimples or of right rectangular pyramidal form but are preferably of trihedron shape to provide same with a plurality of inclined facets having sharp juncture corners.

Figure 2:
FIGURE 2 is a fragmentary sectional view on a greatly enlarged scale of a wall portion of either the tray or grid of the freezing device disclosed in FIGURE 1 with a water repellent coating thereon.
Figure 3:
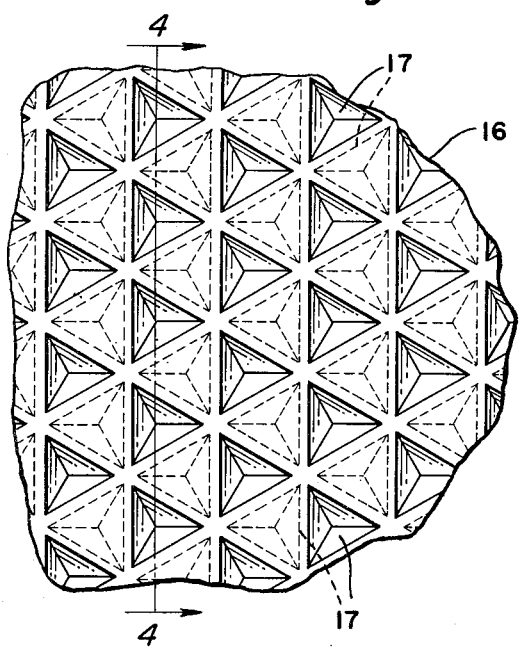
FIGURE 3 is a fragmentary enlarged plan view of a wall portion of the freezing device showing in a magnified manner one form of depressions made therein prior to application of a water repellent coating thereto.
Figure 4:
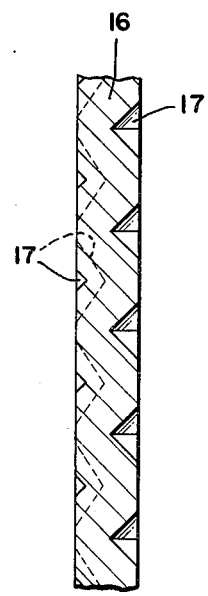
FIGURE 4 is a sectional view through the wall portion disclosed in FIGURE 3 and is taken along the lines 5—5 thereof to show facets of depressions therein.

Referring now to FIGURE 2 of the drawing wherein I show a water repellent coated wall portion 16, which may form walls of tray 10 or the grid walls 11 of the freezing device disclosed in FIGURE 1, having depressions or cavities 17 therein that are trihedron in shape (see FIGURE 3) and these depressions present wall portion 16 with undulations including ridges and furrows or raised points with a valley therebetween such as lands and the individual unconnected depressions or cavities. Tray member 10 is drawn or stamped from an aluminum alloy sheet, roughened and undulated as illustrated by the magnified illustration of wall portion 16, of between .032 and .050 inches in thickness with the depth of depressions 17 being limited to .006 to .007 inches (see FIGURE 4). Since walls, such as walls 11, of an ice tray grid member are usually thicker than walls of a tray in which the grid is disposed the depth of depressions provided in grid walls 11 may be somewhat greater. The patterned or stippled-like surface of wall portion 16 as shown in FIGURE 3 is indicated at A in FIGURE 1 on a partial area of a wall of tray member 10 and at B therein on a partial area of wall 11 of the grid member. Depressions 17 particularly when provided with facets and angularly disposed juncture corners in wall portion 16 of a tray or grid of an ice freezing device or mold play an important role in the innovation of a nonmetallic water repellent material strongly adhering or bonding to a metal wall of such device or mold.

After a tray 10 is shaped or formed or grid walls 11 fabricated from an aluminum sheet having surfaces prepared or roughened as illustrated by wall portion 16 the surface or surfaces are anodized and then a water repellent layer, film or coating of a suitable nonmetallic material, selected from the disclosure in either of the patents or the application hereinbefore identified, is bonded coextensively on the tray or grid walls as shown at 19 in FIGURE 2 and as described in said patents or said application. In the present disclosure coating 19 is nonuniform in thickness and inherently forms or provides on the exposed or ice contacting surface of the coating undulations therealong which are of less magnitude than undulations in the roughened or stippled surface or surfaces of wall portion 16. In other words, the nonuniform thickness of coating 19 creates a greater thickness of the material thereof directly opposite the valleys or furrows provided by depressions 17 over the thickness of the coextensive layer at the raised or ridge portions of the wall surface.

Such creation is highly advantageous in this art since the greater thickness of the portion of the coating or layer 19 at so many points opposite the depressions 17, together with the angular corners of the multifacet or trihedron shape of the depressions along wall 16, increases the tenacity of the bond of the water repellent material thereto to thereby intensify the bondage. Furthermore, this creation is important and beneficial to the endurance or life of the water repellent layer or film 19 on wall 16 when same is a portion of tray 10 or is a wall 11 of the grid. For example, continued operations of mechanically shedding or breaking ice cubes or blocks loose from the coated tray and grid walls may wear the coating thinner or even entirely off the apex of the undulations thereof but a substantial or major portion of the coating remains intact or is retained, by virtue of the particular shape or character of depressions 17, bonded in the depressions of the roughened wall surface. By my discovery I greatly prolong the life and effectiveness of the water repellent material 19 on wall section or portion 16 of either the tray 10 or grid walls 11. Prolongation of the life or endurance of a water repellent coating on roughened surface portions of the material thereto. An additional life expectancy of compared to and differentiated from nonroughened anodized and coated wall surfaces, has been found to be beyond expectations and consequently results in such walls shedding ice with ease therefrom over a longer period of time. One might expect relatively thin ice tray walls, when provided with the impressions or depressions as herein disclosed, to be weakened, but in reality the rigidity of the relatively thin tray is increased and its flexibility is decreased while, at the same time, the patterned or stippled-like wall surfaces thereof are visible through a transparent film or coating thereon and such surfaces have aesthetic appeal.

It should, from the foregoing, be apparent that I have provided an improved coated wall for contacting water and ice in a freezing mold or device. By roughening a wall of a freezing device, such as tray and grid walls as herein disclosed prior to coextensively coating same with a film or layer of water repellent and ice shedding nonmetallic material, I greatly increase the adherence and bondage of the material thereto. An additional life expectancy of coated ice tray and grid walls is afforded by the nonuniform thickness of the coating thereon which results in a coat on a substantial portion of the wall surface opposite the depressions therein even after such coating has been completely worn off the apex points or portions of undulations in surfaces of the walls. The undulated exposed surface or surfaces of a layer of coating material on ice tray and grid walls or on walls of other molds or the like of freezing devices is so minute that such does not interfere with the ease of shedding ice therefrom. Roughened coated wall surfaces of freezing devices thus facilitate release of ice therefrom and prolongs endurance of the coating whereby mechanical ice block releasing or ejecting operations can be carried out over a long or extended period of time to thereby eliminate the frequency of recoating ice tray and grid walls with a water repellent or shedding material.

While the embodiment of the present invention as herein disclosed constitutes a preferred form, it is to be understood that other forms might be adopted.

What is claimed is as follows:

1. A metal mold wall for use in the refrigeration art against which water is to be frozen into ice and from which said ice is to thereafter be mechanically separated, said wall being provided with a multitude of spaced-apart reoccurring macroscopic depressions therein imparting an undulated patterned surface thereto, said wall surface being coated with a nonporous water repellent nonmetallic material bonded in a coextensive layer thereon for contacting the ice, said depressions increasing adherence of said water repellent material to the patterned wall surface, and said layer being of nonuniform thickness as occasioned by undulations in the wall surface with the thicker portions thereof opposite said depressions anchored therein to remain substantially permanent on said wall throughout repeated operations of separating ice therefrom.

2. A mold wall as defined by claim 1 wherein the wall is formed predominately of aluminum which is anodized for further increasing bondage of the layer of water repellent material thereto.

3. An element for use in the refrigeration art comprising, a metal sheet stamped to form the bottom wall and upwardly directed walls of a tray, at least the inner side of walls of said tray against which water is to be frozen into ice and from which said ice is to thereafter be mechanically released being provided with a multitude of spaced-apart reoccurring macroscopic depressions therein imparting an undulated patterned surface thereto, said wall surfaces being coated with a nonporous water repellent nonmetallic material bonded in a coextensive layer thereon for contacting the ice, said depressions increasing adherence of said water repellent material to the patterned wall surfaces of said tray, and said layer being of nonuniform thickness as occasioned by undulations in the wall surfaces with the thicker portions thereof opposite said depressions anchored therein to remain substantially permanent on said walls throughout repeated operations of releasing ice therefrom.

4. An element as defined by claim 3 wherein walls of the tray are composed predominately of aluminum and the inner sides thereof are anodized for further increasing bondage of the layer of water repellent material thereto.

(References on following page)

References Cited in the file of this patent

UNITED STATES PATENTS

| | | | |
|---|---|---|---|
| 518,908 | Ackerman | Apr. 24, 1894 |
| 1,529,729 | Thompson | Mar. 17, 1925 |
| 1,581,394 | Dann | Apr. 20, 1926 |
| 1,973,740 | Andres | Sept. 18, 1934 |
| 2,016,139 | Eddison | Oct. 1, 1935 |
| 2,178,387 | Becker | Oct. 31, 1939 |
| 2,534,408 | Bramberry | Dec. 19, 1950 |
| 2,577,423 | Ludwig et al. | Dec. 4, 1951 |
| 2,647,079 | Burnham | July 28, 1953 |
| 2,878,659 | Prance et al. | Mar. 24, 1959 |